United States Patent [19]
Last

[11] Patent Number: 6,126,045
[45] Date of Patent: Oct. 3, 2000

[54] CONNECTOR ASSEMBLY FOR A FLUID CONNECTION

[75] Inventor: Laurens Last, Monaco, Monaco

[73] Assignee: ITSAC N.V., Antilles, Netherlands

[21] Appl. No.: 09/480,919

[22] Filed: Jan. 11, 2000

Related U.S. Application Data

[63] Continuation of application No. PCT/NL98/00385, Jul. 7, 1998.

[30] Foreign Application Priority Data

Jul. 21, 1997 [NL] Netherlands ............................ 1006636

[51] Int. Cl.[7] .......................... F16L 55/115; B65D 51/00; B65D 41/02
[52] U.S. Cl. ............................ 222/501; 222/81; 222/499; 141/346; 141/351; 251/149.1; 137/614.2; 137/853
[58] Field of Search ............................... 222/81, 83, 83.5, 222/499, 501, 559; 141/346–349, 351–354; 251/149.1; 137/614.2, 853

[56] References Cited

U.S. PATENT DOCUMENTS

| | | | |
|---|---|---|---|
| 3,783,590 | 1/1974 | Allen | 137/853 |
| 4,171,007 | 10/1979 | Bouteille | 137/853 |
| 4,301,590 | 11/1981 | Ward. | |
| 4,375,864 | 3/1983 | Savage | 222/81 |
| 5,095,962 | 3/1992 | Lloyd-davies et al. | 141/346 |
| 5,370,270 | 12/1994 | Adams et al. . | |
| 5,467,806 | 11/1995 | Stricklin et al. | 141/346 |
| 5,632,303 | 5/1997 | Almasy et al. | 137/614.2 |

FOREIGN PATENT DOCUMENTS

WO 94/26611 11/1994 WIPO.

*Primary Examiner*—J. Casimer Jacyna
*Attorney, Agent, or Firm*—Michael Best & Friedrich LLP

[57] ABSTRACT

A connector assembly for a fluid connection, comprising a female part and a male part to be connected to this. The female part has an axial bore and there is a plug to close off the bore. The plug and the male part are provided with cooperating connection devices, which connect the plug with the male part when the male part is inserted into the bore and which maintain this connection when the male part is inserted further into the bore. The plug is provided with at least one hooking part which is elastically movable in a radial direction and has an accompanying hooking surface, which rests against a shoulder and keeps the plug in the bore until the plug and the male part are connected to each other while the male part is inserted into the bore.

26 Claims, 10 Drawing Sheets

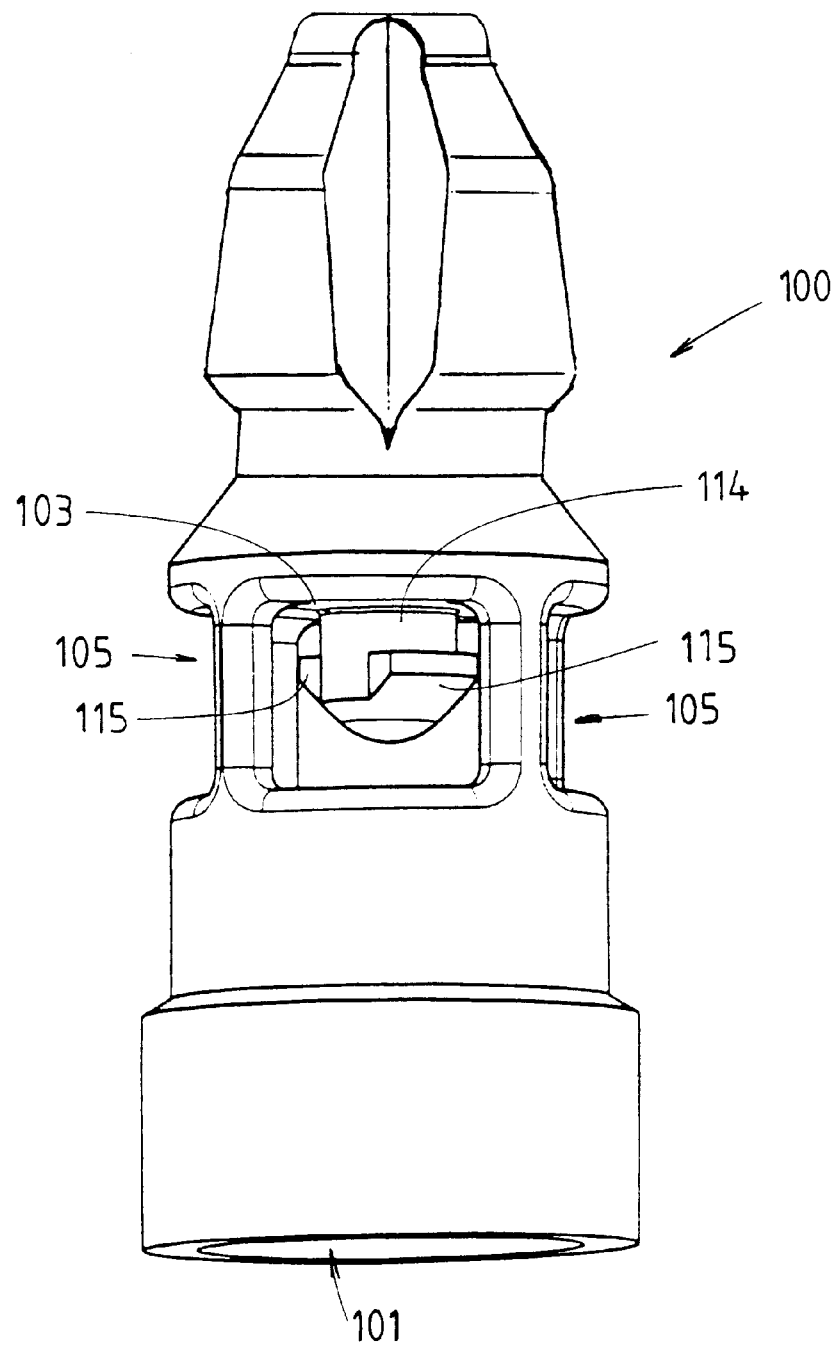
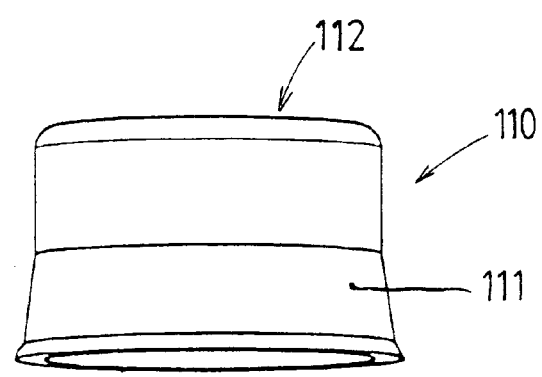
FIG. 5

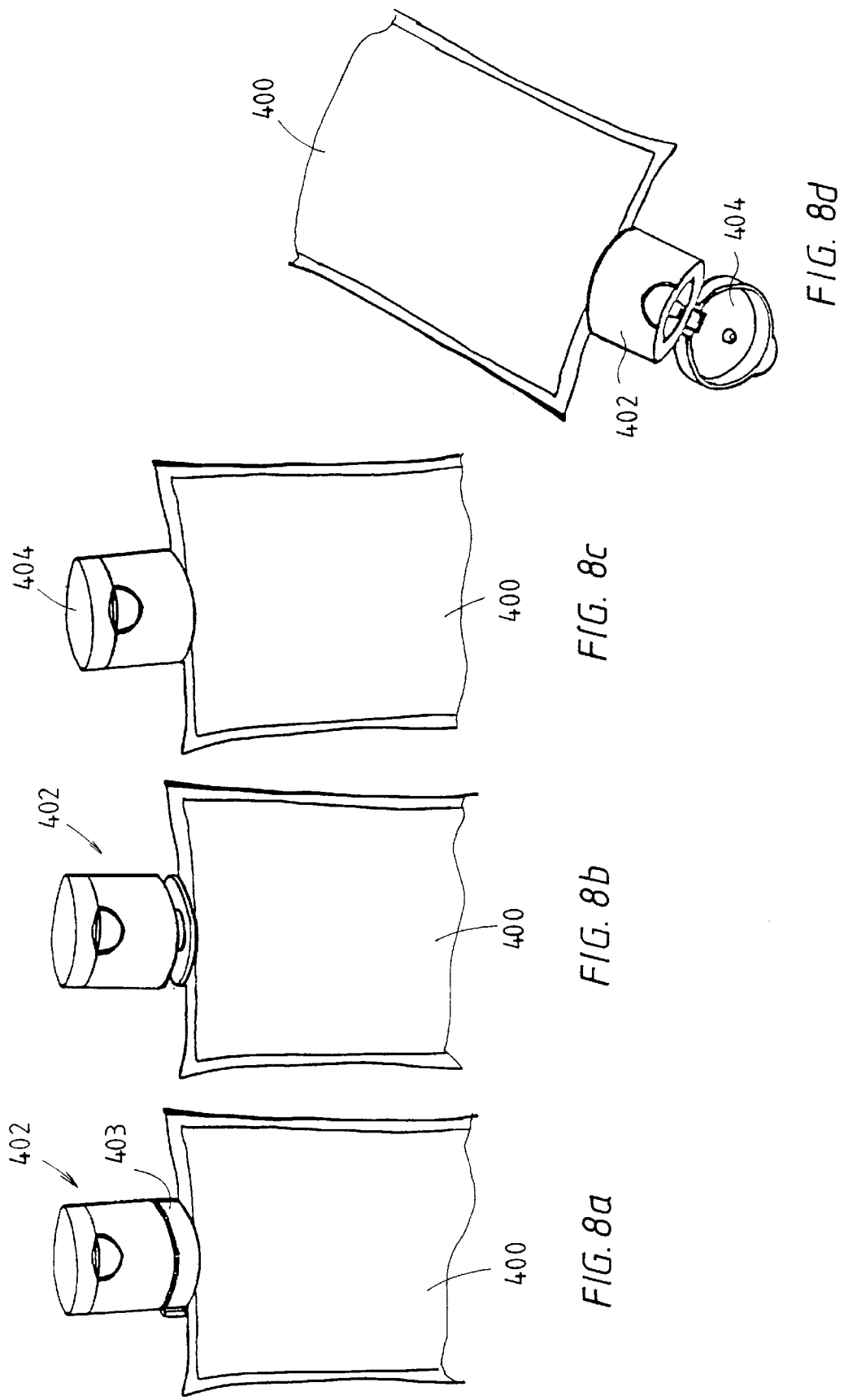

CONNECTOR ASSEMBLY FOR A FLUID CONNECTION

CROSS-REFERENCE TO RELATED APPLICATIONS

This is a continuation application of PCT/NL98/00385 filed Jul. 7, 1998.

FIELD OF THE INVENTION

The present invention concerns a connector assembly for a fluid connection, comprising a female part, a male part to be connected thereto, and a plug, the female part having a body containing an axial bore which extends from an insert opening for the male part through the body and having a seat, extending around the bore, for the plug, which serves to close off the bore; wherein the bore of the female part between the insert opening and the seat forms a shoulder, facing towards the insert opening, and the plug is provided with at least one elastic hooking part with corresponding hooking surface, the hooking part resting in a first position with its hooking surface against the shoulder; and wherein the male part has a head and a recess located behind the head for receiving the hooking part of the plug when the male part is inserted into the bore, so that the plug connects with the male part.

BACKGROUND OF THE INVENTION

A connector assembly for a fluid connection is known, for instance, from U.S. Pat. No. 4,445,551. In this known connector assembly the plug has, at the end facing the insert opening, several hooking-fingers, which can engage in a circumferential groove behind the head of the male part. In their first position the hooking-fingers lie along the shoulder of the bore, in such a way that the head of the male part can be inserted into the plug without the hooking-fingers touching the male part. When the head of the male part has been inserted into the plug and the male part is pushed further into the bore, the hooking-fingers are pushed inward and fall into the groove behind the head of the male part.

The plug slides inside the bore until a part of the plug which is provided with holes protrudes outside the bore. The other part of the plug remains in the bore.

To prevent the plug moving out of the bore in the direction of the insert opening, the known plug has a stop rim near the end that is facing away from the hooking-fingers, which rests against a stop rim formed by the bore.

This known connector assembly has a number of disadvantages. The first disadvantage is that the known plug with its outward-facing hooking-fingers has to be inserted into the bore from the insert opening, so that the stop rim of the plug can only be slightly larger than the inside diameter of the stop rim of the bore. As a result, the plug can only withstand a small pressure in the direction of the insert opening of the bore. Another disadvantage is that the hooking-fingers are thin and are therefore easily damaged or torn. It is also a drawback that when the male part is inserted at an angle the plug can be pushed out of its seat without the plug being properly connected to the male part. If subsequently the male part is pulled back, the plug is not drawn into its seat and the bore remains open. A further disadvantage of the known connector assembly is that the plug can easily adopt a slanted position in the seat when the male part is drawn back from the female part, so that the plug does not properly close off the bore.

Furthermore, connector assemblies are known of a different type, in which the plug is completely released from the bore of the female part and is then retained on the head of the male part. An example of such a connector assembly is described in U.S. Pat. No. 5,370,270. This known connector assembly has the disadvantage that an undesirably high axial force is required to connect the male part with the plug and subsequently to push the plug out of the bore. It is also a disadvantage that the plug is pushed out of its seat already before the plug and the male part are connected to each other. This makes it necessary to design the plug and the bore without seams to ensure proper sealing between the bore and the plug that has been pushed out of its seat, which requires a complicated injection mould and increases the cost.

OBJECTS OF THE INVENTION

The present invention aims to provide an improved connector assembly which guarantees a highly reliable seal. Furthermore the present invention aims to provide a connector assembly which allows an almost unrestricted choice of the axial force that is required during the different stages of making and breaking the connection between the male and the female part. The present invention especially aims to provide a connector assembly in which, on the one hand, the axial force required to push the plug, connected to the male part, from the bore is essentially of the same magnitude as the axial force required to connect the male part and the plug, and in which, on the other hand, it is guaranteed that the male part connects with the plug before the plug comes out of its seat.

SUMMARY OF THE INVENTION

The present invention provides a connector assembly for a fluid connection, comprising a female part, a male part to be connected thereto, and a plug, the female part having a body containing an axial bore which extends from an insert opening for the male part through the body and having a seat, extending around the bore, for the plug, which serves to close off the bore; wherein the bore of the female part between the insert opening and the seat forms a shoulder, facing towards the insert opening, and the plug is provided with at least one elastic hooking part with corresponding hooking surface, the hooking part resting in a first position with its hooking surface against the shoulder; and wherein the male part has a head and a recess located behind the head for receiving the hooking part of the plug when the male part is inserted into the bore, so that the plug connects with the male part.

According to a first aspect of the invention there is radially next to the hooking part in its first position a space between the hooking part and the female part, and the hooking part of the plug has been designed such that—when the male part is inserted into the bore—the head of the male part pushes the hooking part from its first position to a second position which is located radially further outward compared with the first position, and such that the hooking part, after passing the head of the male part, springs elastically inward to a third position and falls into the recess of the male part while the contact between the hooking surface and the shoulder is maintained.

These measures according to the invention ensure that the plug is gripped very firmly in the bore at the moment when the male part connects with the plug, thus guaranteeing that the plug first connects with the male part before the plug moves from its seat. Only a small axial force on the male part is required.

The present invention concerns, according to a second aspect thereof, a connector assembly for a fluid connection, comprising a female part, a male part to be connected to this, and a plug, with the female part having a body containing an axial bore which extends from an insert opening for the male part through the body and having a seat, extending around the bore, for the plug, which serves to close off the bore, and with the male part having an internal axial passage for passage of the liquid and a closing part located in the axial passage, whereby the plug is removed from its seat when the male part is inserted into the bore, with the feature that the closing part has a flexible ring wall, which rests under prestress against the wall of the axial passage and can spring radially inward so as to provide a passage for the liquid.

BRIEF DESCRIPTION OF THE DRAWINGS

The present invention will now be explained on the basis of the drawing. The figures show:

FIG. 5 in perspective, a preferred embodiment of the male part of the connector assembly according to the second aspect of the invention;

FIGS. 8a–d a variant of the connector assembly according to the invention;

DESCRIPTION OF PREFERRED EMBODIMENTS

Figure 1:
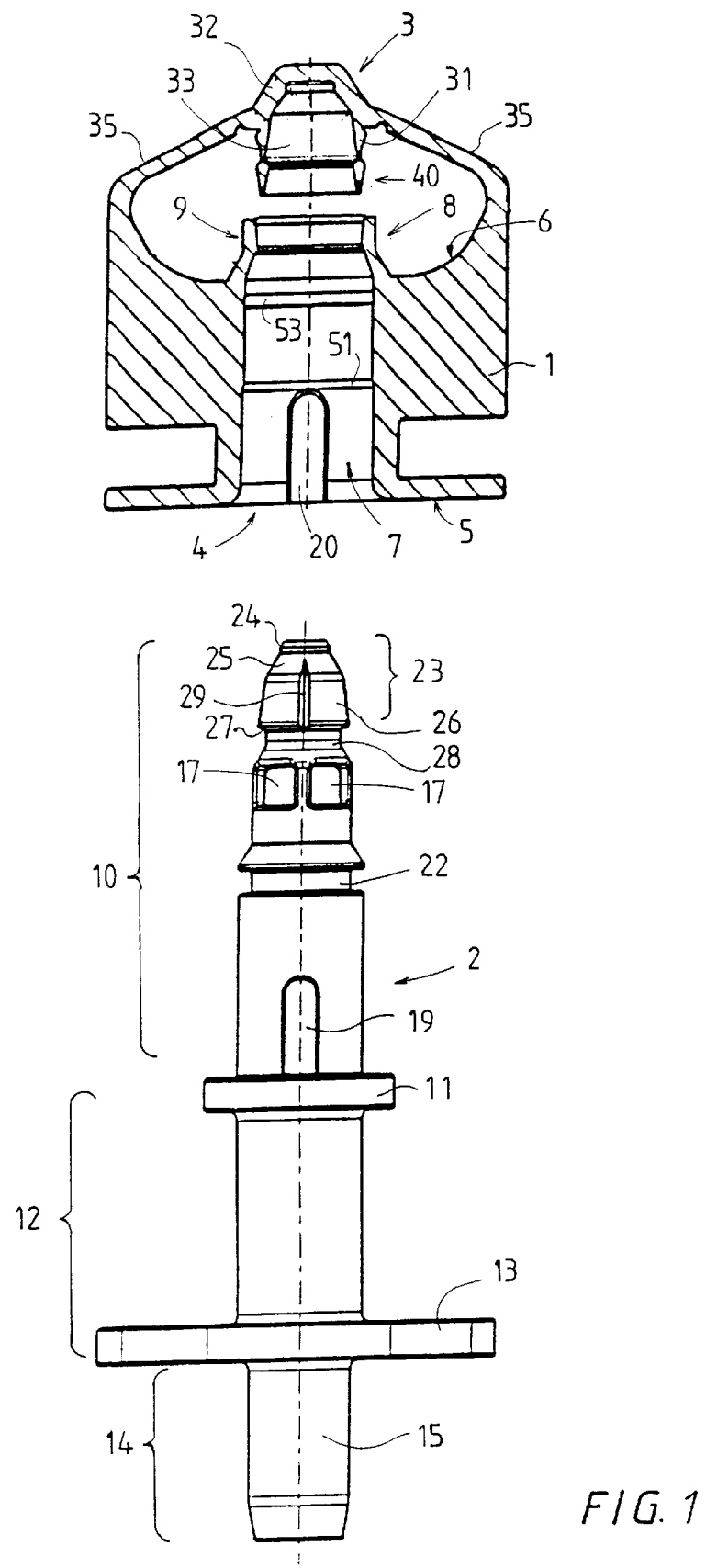
FIG. 1 schematically, partly in cross-section, the parts of a preferred embodiment for the connector assembly according to the invention.

Refering to FIGS. 1, 2, 3 and 4a–e first the construction and operation of a preferred embodiment of the connector assembly according to the invention will be explained. The connector assembly shown is intended for providing a fluid connection for fluids, gases, liquid substances, such as soap, cosmetic creams, soft drink syrup, etcetera. The connector assembly is also suitable for powders, in particular fine powders, having suitable flow properties to flow through such a connector, such as coffee powder and the like or toner powder for printers and copiers, etcetera. The female part of the connector assembly could then be part of a cartridge containing powder, whereas the male part is of the copier, printer or coffee machine.

The connector assembly in fact comprises three components: a female part 1, a male part 2 which can be connected to it, and a plug 3. The female part 1 and the plug 3 are preferably manufactured as a unitary plastic object in a suitable mould by means of injection moulding. The male part 2 may also be manufactured as a plastic injection moulding product, but the male part 2 may also be made of metal, for instance stainless steel.

The female part 1 has a body with a front end 5 and a rear end 6, with an axial and essentially cylindrical bore 7 extending through the body from the insert opening 4 for the male part 2 at the front end 5; this bore 7 is open at both ends. The edge at the transition from the front end 5 to the bore 7 is bevelled. At the rear end 6 the bore 7 is bounded by a ring wall 8 protruding from the body. The inner surface of the ring wall 8 forms a seat 9 for the plug 3 extending around the bore 7; this plug 3 serves for closing of the bore 7.

The body of the female part 1 is especially suited for being welded or glued into the wall or a seam of a flexible plastic bag. The body of the female part 1 can also be laid out to be placed in the neck of a bottle or similar container, or in a stable ring-shaped holder fitted to a flexible bag. The latter design is known notably for so-called "bag-in-box" systems.

Figure 3:
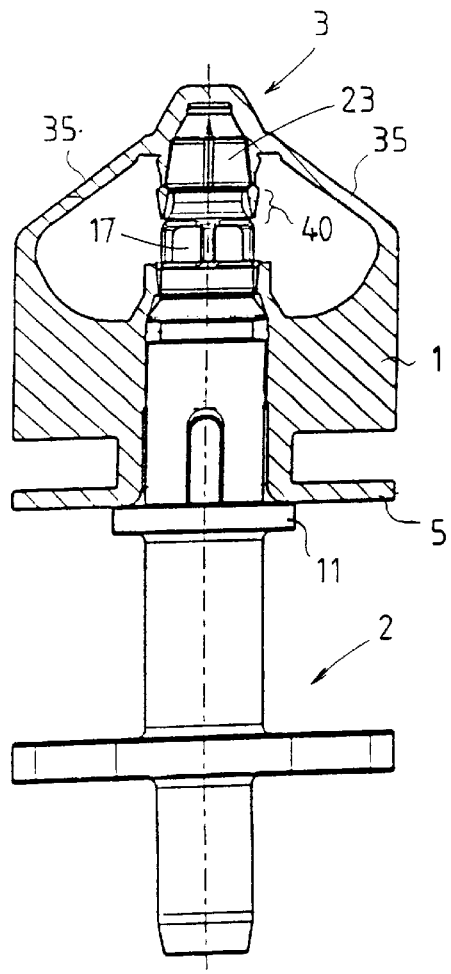
FIG. 3 schematically, the connector assembly of FIG. 1, with the plug free from the bore in the female part and borne by the male part.

The male part 2 has a tubular end piece 10 fitting into the bore 7 of the female part 1. When the male part 2 has been fully inserted into the female part 1, as shown in FIG. 3, a radially protruding stop ridge 11 of the male part 2 rests against the front end 5 of the female part 1. The male part 2 further comprises a tubular part 12, connected to the endpiece 10, with a ring-shaped projection 13 to facilitate handling of the male part 2.

Connected to the tubular part 12 is a hose coupling part 14, enabling the male part 2 to be connected to a hose (not shown). The male part 2 contains an internal axial passage 15, indicated by dotted lines, for the fluid. The axial passage 15 is open at the end of the hose connection part 14 and is blind at the other end, which means that the passage 15 does not extend to the tip of the end piece 10 but stops at some distance of this. Within the male part 2 a number, in this case four, of cross passages 17 have been formed, which connect the axial passage 15 near its blind end with the perimeter of the male part 2.

The male part 2 further comprises at its perimeter two diametrically opposed blocking devices 19, which extend parallel with the longitudinal axis of the male part 2 from the stop ridge 11 in the direction of the tip of the end piece 10.

The female part 1 is provided with two diametrically opposed grooves 20, extending in axial direction along the bore 7, which serve to receive the blocking devices 19 when the male part 2 is inserted into the bore 7. The cooperation between the blocking devices 19 and the grooves 20 prevents the male part 2 from turning with respect to the female part 1 before the male element 2 is connected to the plug 3, as will be explained further on. Moreover, the blocking devices 19 and the grooves 20 make it easier to insert the male part 2 into the bore 7. In addition, by varying the number of blocking devices and grooves, as well as their positions and shapes, it is possible to obtain a kind of key, so that a unique combination of a female part 1 and a male part 2 is obtained and a connection between non-matching male and female parts is prevented.

The end piece 10 is further provided with a ring-shaped groove 22 to receive a sealing ring (not shown here to avoid confusion), which establishes the seal between the male part 2 and the female part 1 and also contributes to holding the male part 2 in the bore 7. The groove 22 is located in the area between the cross passages 17 and the stop ridge 11. In a variant not shown here, instead of the groove 22 with a sealing ring a ridge can be provided at the outside of the male part 2.

The tip of the end piece 10 of the male part 2 is constructed as an essentially conical head 23 with at its extremity an essentially cylindrical projection 24. In the direction away from the tip the head 23 first has a locating surface 25, coned towards the outside, and contiguous with this a gripping surface 26, outwardly tapered at a small cone angle towards the outside. Contiguous with the gripping surface 26 is a shoulder surface 27, tapered towards the inside, which ends at the bottom of a recess, formed by the circumferential groove 28, between the head 23 and the part of the male part 2 that is provided with cross passages 17. The head 23 is provided with two diametrically opposed grooves 29, which extend from the tip of the end piece 10 to behind the head 23 and end in the groove-shaped recess 28.

The plug 3 has a ring wall 31 and an end wall 32, which together enclose a cavity 33 in plug 3 which is open towards the insert opening 4; this cavity 33 is intended to receive the head 23 of the male part 2. The end wall 32 forms a cylindrical recess 34, whose diameter is adjusted to the diameter of the cylindrical projection 24 of the head 23. This complementary shape ensures that the plug 3 will remain seated in the correct position on the head 23 and will not tilt. Similarly, the inner surface of the ring wall 31 is made complementary to the head 23 of the male part 2. The grooves 29 allow any substance present in the cavity 33 to escape via the grooves 29 when the head 23 enters the cavity 33.

The plug 3 is connected with the body of the female part 1 by two flexible bodies 35. The bodies 35 ensure that the plug 3 cannot be separated from the female part 1. Furthermore, the length of the bodies 35 is such that when the connector assembly is in the position shown in FIG. 1, the male part 2 can connect with the plug 3.

At the end of plug 3 which faces the insert opening 4 of the female part 1, the plug 3 has a radially expandable and compressible ring-shaped collar 40, which forms a whole with plug 3. The collar 40 has an interior surface 41, tapered from its free edge towards the inside, which connects to a shoulder surface 42 coned towards the outside, which in turn connects to the inside of ring wall 31. The collar 40 further has an exterior surface 44, tapered from its free edge towards the outside, which connects to a ring-shaped hooking surface 45 which is coned towards the inside, which in turn connects to the outer surface of ring wall 31.

The plug 3 further has a sealing rim 46 located around the outside of the ring wall 31 and protruding towards the outside. The plug 3 also has an outward protruding ring-shaped stop surface 47 at the side of the sealing rim 46 which faces away from the collar 40.

The ring wall 8 has an axial end face 50, against which the stop surface 47 of the plug 3 rests when the plug 3 is in its seat 9. Viewed in the insert direction of the male part 2, the bore 7 has a first part with such a diameter that the male part 2 can be inserted in it with a light drive fit.

At reference number 51 the first part changes to a second part of bore 7 with a slightly smaller diameter. A shallow circumferential groove 53 in the bore 7 (see FIG. 1) is located so that the sealing ring (not shown) of the male part 2, inserted fully into the female part 1, engages partly in this groove, so that on the one hand a reliable seal is obtained and on the other hand a kind of snap connection is obtained.

The ring wall 8 has (see FIG. 4a), viewed from the end face 50 in the direction of the insert opening 4, a cylindrical sealing surface 54, with an inner diameter that is slightly smaller than the outer diameter of the sealing rim 46 of the plug 3. Consequently the plug 3 with its sealing rim 46 will fit tightly in the ring wall 8, thus establishing a radial seal.

Viewed in the same direction an inward tapered transition surface 55 connects to the sealing surface 54; this transition surface 55 in its turn passes into an outward tapered shoulder surface 56 of the bore 7. Connected to this conical shoulder surface 56 is a transition surface 57, tapered outwards at a smaller angle, which connects to the second cylindrical part of the bore 7.

On the basis of FIGS. 4a–4e the operation of the connector assembly will be explained. It should be noted that for the sake of clarity not all of the reference numbers mentioned in the description have been given; in these cases the reference numbers can be found in one of the other FIGS. 4a–e.

Figure 4A:
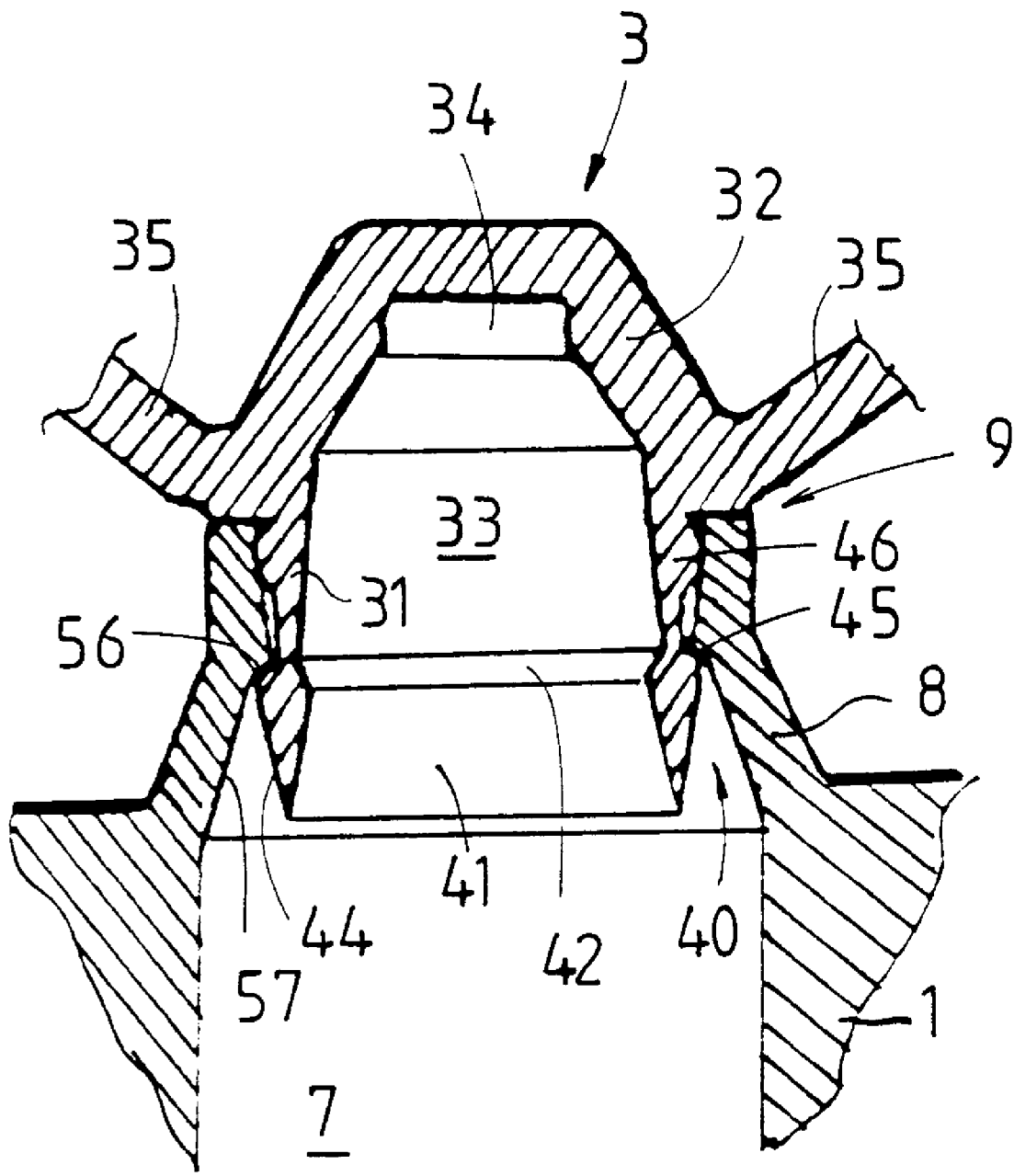
FIGS. 4a–e: in cross-section, different successive stages of making a fluid connection with the connector assembly of FIG. 1.
Figure 4B:
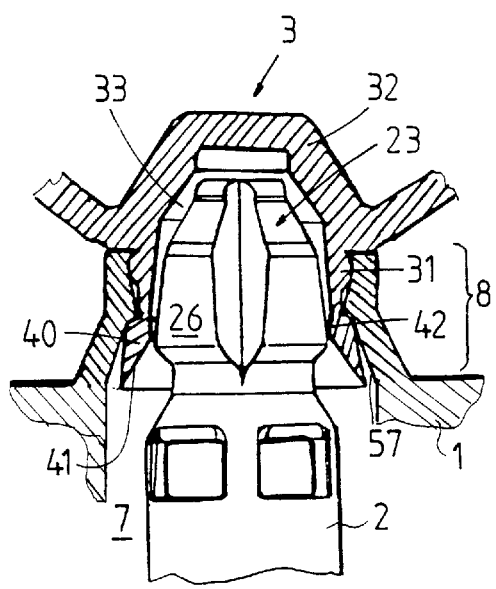

FIG. 4a shows in which way the plug 3, located in its seat, closes off the bore 7. The plug 3 rests with its stop surface 47 against the end face 50 of the ring wall 8 and presses the sealing rim 46 into the ring wall 8. In FIG. 4a the collar 40 is in its first position and the ring-shaped smooth hooking surface 45 of the plug 3 rests at an elastic prestress against the shoulder surface 56 of the bore 7. Note that the contact of the stop surface 47 against the end face 50 provides a second seal of the bore 7. In this first position of the collar 40, between the exterior surface 44 of the collar 40 and the transition surface 57 of the bore 7 a space is present whose size in a radial sense increases from the shoulder 56 towards the insert opening 4. FIG. 4b shows the situation when the head 23 of the male part 2 is inserted into the cavity 33 of the plug 3. As the smallest diameter of the gripping surface 26 of the head 23 is smaller than the smallest diameter of the interior surface 41 in the first position of the collar 40 and as the taper angle of the interior surface 41 of the collar 40 is larger than the taper angle of the gripping surface 26 of the head 23, contact between the head 23 and the collar 40 is made especially at the location of the transition rim of the interior surface 41 to the shoulder surface 42 of the plug 3.

In FIGS. 4a and 4b it can be seen that this transition rim, viewed in the insert direction, lies axially in front of the shoulder surface 56 of the bore 7 when the plug 3 is in the seat 9. As a result, the collar 40 is subjected to an outward bending moment with respect to the thin connection of the collar 40 to the ring wall 31. As the surface 57 of the bore 7 of the shoulder surface 56 slopes outward, around the collar 40 of the plug 3 which is located in its seat a space is present of such dimensions that collar 40 can expand radially without significant resistance of the female part 1 to allow the head 23 to be inserted in the cavity 33. The force required for the expansion of the collar 40 is therefore determined in particular by the rigidity of the collar 40 itself.

In FIG. 4b the collar 40 is in its second position, pushed as far outward as possible. As the collar 40 has expanded, the force that would be required to push the plug 3 from its seat 9 becomes so great, that first the head 23 will fully enter the cavity 33 before the plug 3 can move from its seat.

Figure 4C:
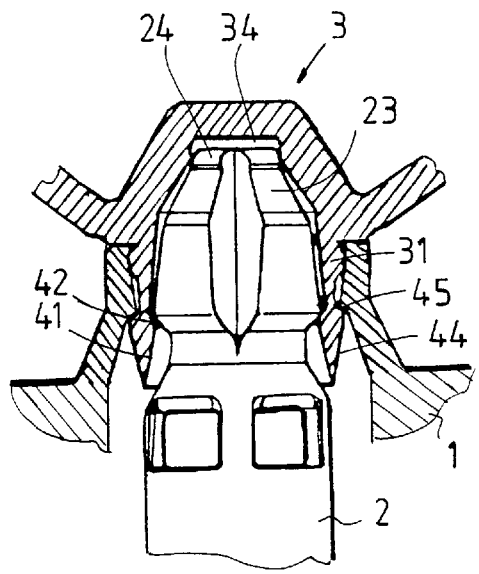
Figure 4D:
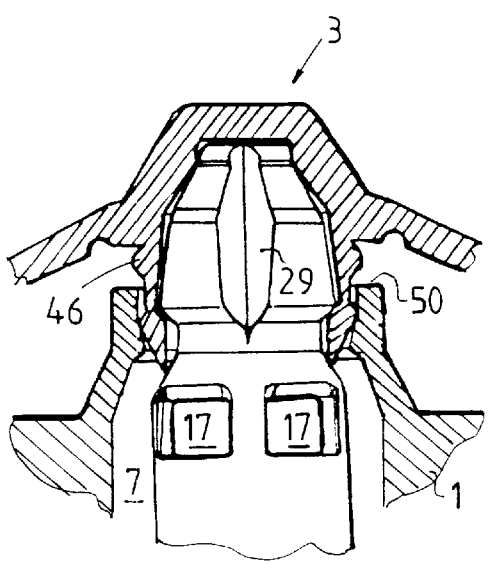
Figure 4E:
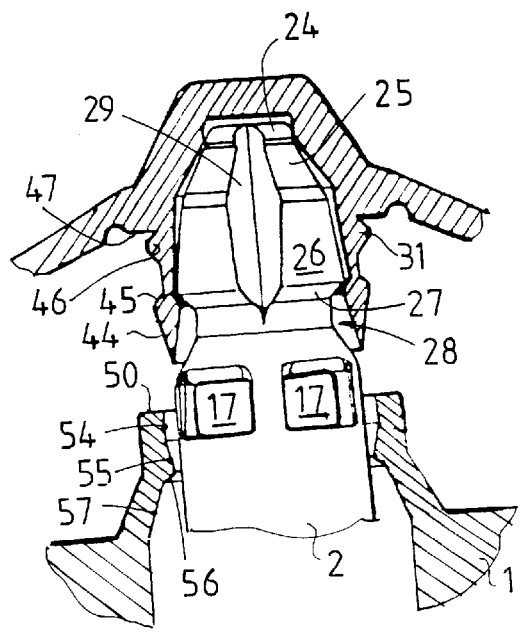

FIG. 4c shows the situation when the head 23 of the male part 2 is located entirely in the cavity 33 of the plug 3. The cylindrical projection 24 of the head 23 fits in the recess 34. Furthermore, the collar 40 has sprung back elastically from its second position as shown in FIG. 4b to a third position. This third position is slightly further outward than the first position shown in FIG. 4a, so the shoulder surface 42 of the plug 3 lies under prestress against the shoulder surface 27 of the head 23 and thus holds the head 23 in the plug 3 in a reliable way. When the male part 2 is inserted further into the female part 1, the shoulder surface 56 of the bore 7 exerts a reaction force on the hooking surface 45 of the collar 40, which leads to an inward bending moment on the collar 40, again with respect to the thin connection of the collar 40 to the ring wall 31. As the male part 2, inserted into the plug 3, has a circumferential groove 28 at the same level as the collar 40, the collar 40 can easily be compressed radially and so the diameter of the collar 40 decreases. Consequently the hooking surface 45 becomes more parallel to the axis of the male part 2, so that the force exerted via the hooking surface 45 on the ring wall 8 causes the ring wall 8 to expand radially to a greater degree. As a result the collar 40 can pass the smallest diameter of the shoulder surface 56 of the bore 7 in a fourth position, pressed further inward, thus coming in the position shown in FIG. 4d.

When the male part 2 moves to the fully inserted position, the plug 3 comes entirely free from the bore 7. The previously compressed collar 40 springs outward again to its third position, but the head 23 remains gripped by the shoulder surface 42 of the plug 3. Via the position shown in FIG. 4e, eventually the situation shown in FIG. 3 is reached, in which the cross passages 17 of the male part 2 are located between the collar 40 of the plug 3 and the ring wall 8 of the female part 1, and the fluid connection is established. When the male part 2, starting from the position shown in FIG. 3, is withdrawn from the bore 7 of the female part 1, the head 23 takes the plug 3 along in the direction of the ring wall 8 of the bore 7. Consequently, the conical exterior surface 44 of the collar 40 enters the part of the bore 7 which is bounded by the sealing surface 54. As soon as the exterior surface 44 makes contact with the ring wall 8, the collar 40 is compressed radially, back to its fourth position, so that the force which is required to pull the head 23 from the plug 3 has become so much greater that first the plug 3 is pulled completely from its seat 9. When the male part 2 is pulled back further, the collar 40 subsequently passes the transition edge between the transition surface 55 and the shoulder surface 56 of the bore 7. As soon as the plug 3 is in its seat 9, the shoulder surface 27 of the head 23 exerts an outward bending moment on the collar 40; at that moment this collar 40 can easily expand again radially to its second position. As a result the head 23 can then be pulled from the plug 3 with a small force and subsequently the collar 40 springs back to its first position.

With the connector assembly according to the invention it is possible to dimension as desired the axial force required during the different phases of connecting and disconnecting the male and female parts. For instance, it is possible to keep the axial force essentially constant during all the phases described above. In particular it is possible with the connector assembly described here that the axial force required to connect the male part 2 with the plug 3 is essentially equal to the axial force required to push the plug 3 subsequently from the bore 7.

In a variant not shown here it may be provided that the cross section of the collar 40 is not uniform along its entire perimeter, but is built up from segments which are separated from each other by axial dividing seams or are connected to each other by thin bridging parts designed as thin film. The collar 40 may also be replaced by several discrete hooking fingers around the perimeter of the plug 3.

FIG. 5 shows one end, to be inserted into a female part, of a preferred embodiment of the male part 100 according to the second aspect of the invention. The male part 100 is very similar to the male part 2 described earlier, to which reference is made here, and can also be used in combination with the female part 1. An important difference is that the male part 100 is provided with an internal closing part, as will be explained below.

The male part 100 has an internal axial passage 101 for a liquid, which is open on one end and is made blind at the tip of the insert end, and ends at an end wall 103. Several cross passages 105 have been provided, in this case four around the perimeter of the male part 100, each extending from the outer surface of the male part 100 to an outlet in the axial passage 101. In the axial passage 101, at the location of the outlets of the cross passages 105, a closing body 110 is fitted, which is shown separately in FIG. 5.

The closing body 110 is essentially cup-shaped with a flexible ring wall 111, which is intended to lie under prestress against the interior wall of the axial passage 101, thereby closing off the outlets of the cross passages 105. The flexible ring wall 111 can bend radially inward so as to provide a passage for the liquid. A suitable design of the closing body 110 makes it possible to choose the prestress with which the ring wall 111 presses against the axial passage 101 and the rigidity of the ring wall 111 in such a way that a passage is only created when there is a certain pressure difference between the inside and the outside of the ring wall 111. Furthermore, it will be clear that the closing body 110 acts as a non-return valve. In particular the closing body 110 has a cross wall 112, transverse to the flexible ring wall 111, with a central opening in it (not discernible here).

Preferably the closing body 110 can be removed from the male part 100 for cleaning or changing. Moulded to the end wall 103 of the axial passage 101 is a shank 114 with two diametrically opposed radial projections 115 at some distance from the end wall 103. In the mounted position of the closing body 110 the shank 114 protrudes through the opening in the cross wall 112 of the closing body 110, so that the projections 115 hook behind the cross wall 112 of the closing body 110.

The closing body 110 is preferably an undivided object of a suitable rubber, silicone or elastomer and can be manufactured by injection moulding. As the closing body covers the outlets of the cross passages 105 the chance of undesired contamination of the axial passage, or a substance present in this, is minimal. It is also possible with this closing body 110 to prevent the presence of undesired air when making the connection with a suitable female part.

Figure 6:
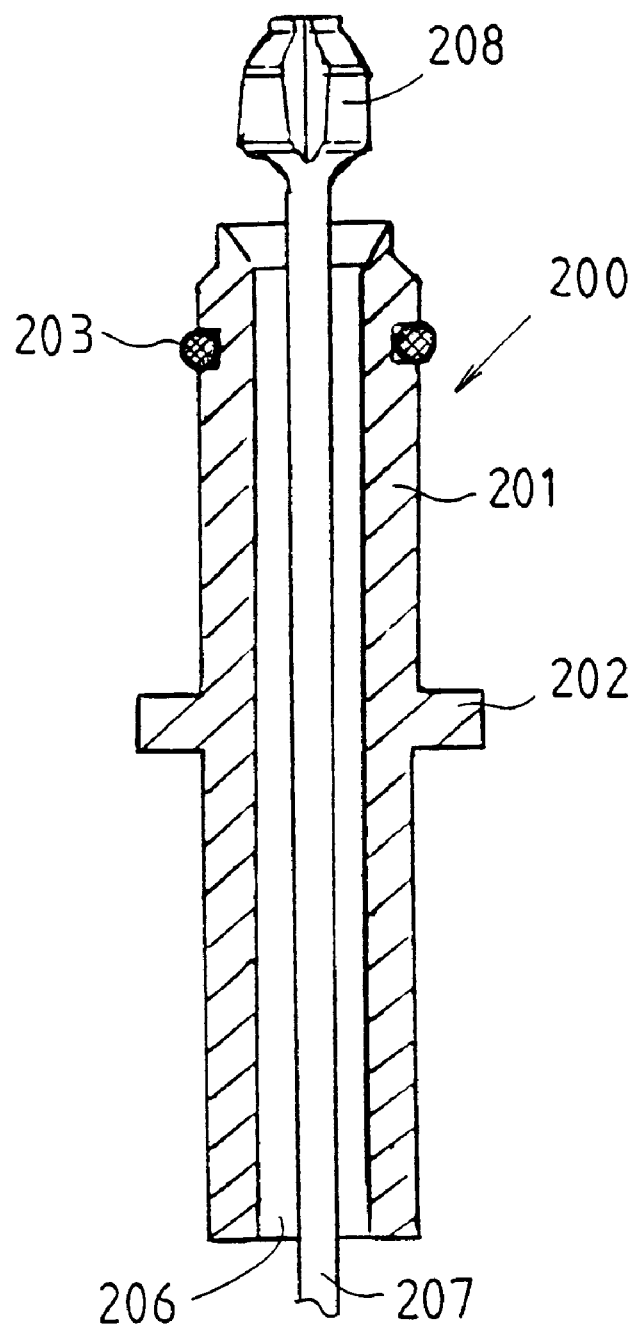
FIG. 6 in cross-section, a variant of the male part of the connector assembly according to the invention.

FIG. 6 shows a male part 200, which is suitable for application in combination with the connector assembly described in FIGS. 1, 2, 3 and 4a–4e, namely for filling of a container which is provided with the female part 1 or similar. The male part 200 comprises a tubular body 201 with a stop ridge 202, which in the fully inserted position rests against the female part. Furthermore, an O-ring 203 can be recognised which accomplishes the seal between the male part 200 and the female part. The tubular body 202 has an internal axial passage 206, which is open at the insert end. In this axial passage 206 a rod 207 is provided which can move back and forth, with a head 208 which is in essence similar to the head 23 of the male part 2. To fill a container the male part 200 is inserted into the female part 1. In this situation it is conceivable that the plug 3 is already out of its seat 9 or that the plug 3 is still in its seat 9. This will depend notably on the production method chosen for the assembly of plug 3 and the female part 1. By operating the rod 207 the plug 3 can be pushed from the bore 7, if necessary, and the container can be filled through the female part 1. After filling the plug 3 is pulled into the seat 9 with the rod 207, thus closing the container. The male part 200 shown in FIG. 6 can also be used to first create a vacuum in the container and subsequently pull the plug 3 into the female part 1. The closure of the bore 7 thus obtained is such that the vacuum is maintained for a long time. Subsequently a similar male part 200 can be used, if necessary under sterile conditions, to push the plug 3 from its seat 9 again and the container can be filled through the passage 206, without air entering the container. In this case it is important that the plug 3 is pulled back into its seat 9 using the same male part 200 as the one with which the container was filled. Note that the head 208 can be pulled against the body 201 to obtain a seal between these parts, so that no air and/or contamination can enter the passage 206.

Figure 7A:
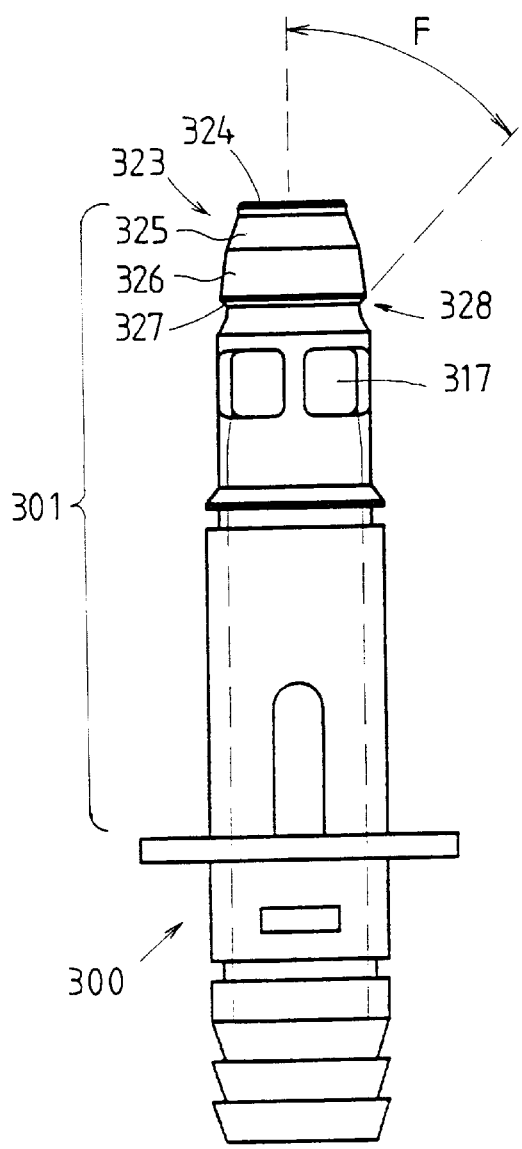
FIG. 7a in side view, another embodiment of the male part of the connector assembly according to the invention, in which the male part is suitable for connecting with and disconnecting from the plug multiple times.

FIG. 7a shows a male part 300 with an insert part 301, which is essentially identical to the part 10 of the male part 2 shown in FIG. 1. In particular the insert part 301 is suitable for insertion into the bore of a female part, not shown, which is essentially identical to the female part 1 shown in FIG. 1.

The male part 300 has a head 323 with a cylindrical projection 324 at its end, a locating surface 325 and a conical gripping surface 326. The gripping surface 326 passes, via a shoulder surface 327 sloping inward at an angle F with respect to the longitudinal axis, into a recess 328 located behind the head 323. The head 323 of the male part 300 fits in the corresponding cavity of the plug of the female part in such a way that it can be inserted into and pulled out of the cavity multiple times.

Figure 7B:
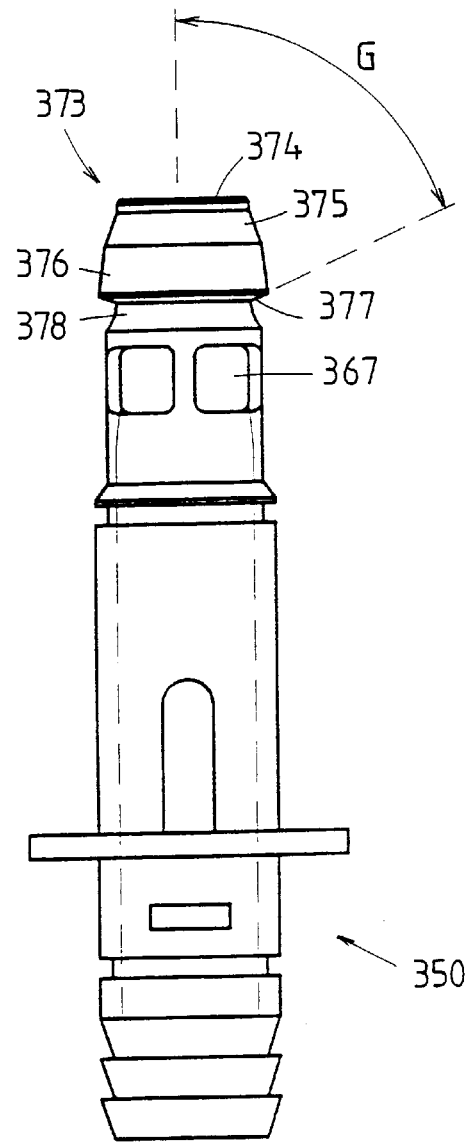
FIG. 7b a variant of the male part of FIG. 7a, in which the male part can be connected with the plug only once to form a permanent connectio.

FIG. 7b shows, at the same scale as FIG. 7a, a male part 350 which is a variant of the male part 300. The male part 350 can be connected with exactly the same female part and corresponding plug as the male part 300. The difference between the male parts 300 and 350 consists of the design of the head 373, which is such that this head 373 cannot leave the cavity of the plug, unless a destructive force is used. The head 373 has, similar to the head 323, a projection 374, a locating surface 375, a conical gripping surface 376, and a shoulder surface 377, which connects to a recess 378. The difference between the head 323 and the head 373 is that the diameter of the head 373 is larger, so that the ring wall of the plug of the female part is expanded to a substantial degree when the head 373 is located in the cavity of the plug.

In particular it can be seen from FIG. 7b that the largest diameter of the head 373 is larger than the diameter of the part provided with the openings 367, whereas with the head 323 the largest diameter of the head 323 is smaller than the diameter of the part provided with the openings 317, the latter diameter being equal to the diameter of the part provided with the openings 367. Owing to the oversized diameter of the head 323 the latter is clamped with a high radial force in the cavity of the plug, whereby the collar of this plug is not pressed radially outward and this collar thus keeps the head 373 firmly in the cavity. Another difference between the head 373 and the head 323 is that the shoulder surface makes an angle G with the longitudinal axis which is substantially larger than the angle F in FIG. 7a; the angle G is almost perpendicular. As a result, when the male part 350 is pulled outward, the shoulder surface 377 will not exert a sufficient radial force on the collar of the plug to make this expand radially so the head 373 cannot come out of the plug.

When the male part 350 is connected with the plug, this connection is therefore permanent, so that this connector assembly is suitable for being opened and closed multiple times without the male part 350 disconnecting from the plug. Such a design is especially advantageous in applications as explained below on the basis of FIGS. 8a–d and FIGS. 9a and b.

In a variant of the male part according to FIG. 7b, not shown here, the head is provided with several corrugations protruding outward, of which the sides facing towards the collar of the plug are each almost perpendicular to the longitudinal axis of the male part.

FIGS. 8a–d show a container 400, which is provided with the female part 1 (not discernible here) or a similar female part, and a variant of the male part 350 shown in FIG. 7b, designed in the form of a closable tap 402.

Figure 2:
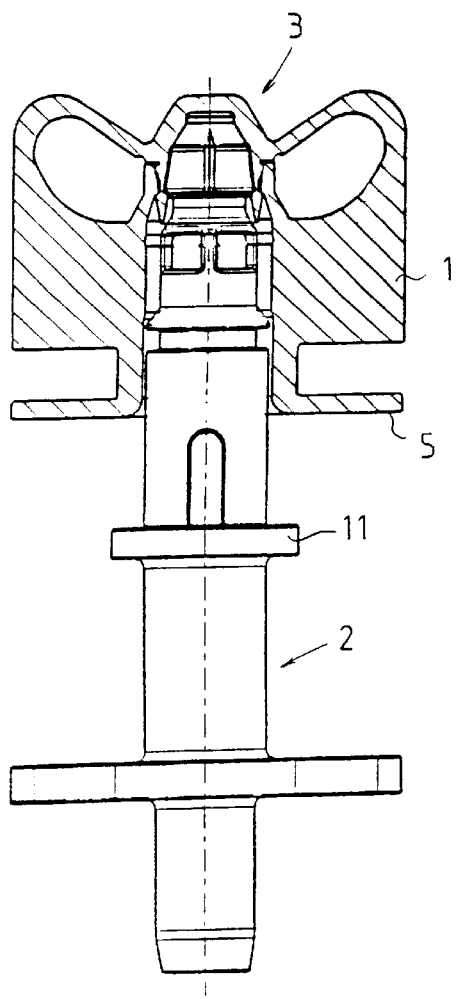
FIG. 2 schematically, the connector assembly of FIG. 1, with the plug closing off the bore in the female part and the male part inserted in the female part and the plug.

In FIG. 8a a removable band 403 can be seen, which keeps the male part 402 at some distance of the female part, in such away that the male part 402 is connected with the plug 3 of the female part 1, but the plug 3 is still in its seat 9 (see FIGS. 2 and 4). After the band 403 or other temporary spacer has been removed, the tap 402 can be pushed towards the female part 1, causing the plug 3 to come out of its seat. The tap 402 itself has an additional and manually operable closing body 404, in this case a hinging cover, which is shown in the opened position in FIG. 8d. By pulling the tap 402 outward, the plug 3 is pulled back into its seat 9 and the container 400 is hermetically sealed. Owing to the design of the male part 402 as explained on the basis of FIG. 7b, the tap 402 cannot be removed from the container 400.

Figure 9A:
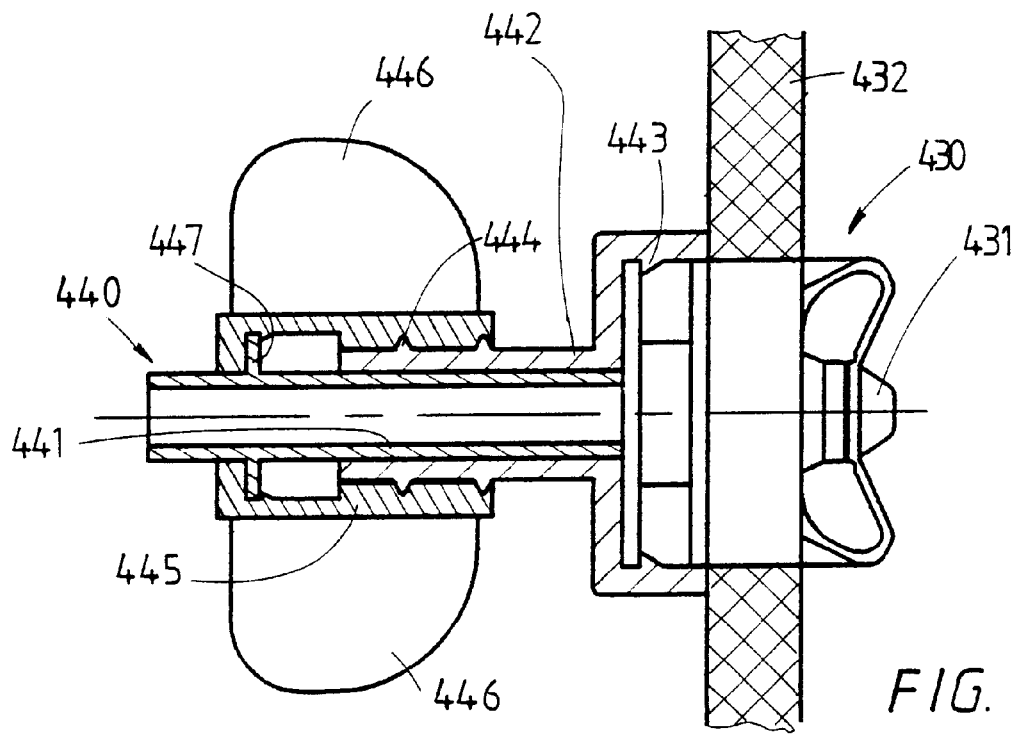
FIGS. 9a and 9b in longitudinal section, a subsequent embodiment of the connector assembly according to the invention, and FIGS. 10a and 10b in longitudinal section, a subsequent embodiment of the connector assembly according to the invention.
Figure 9B:
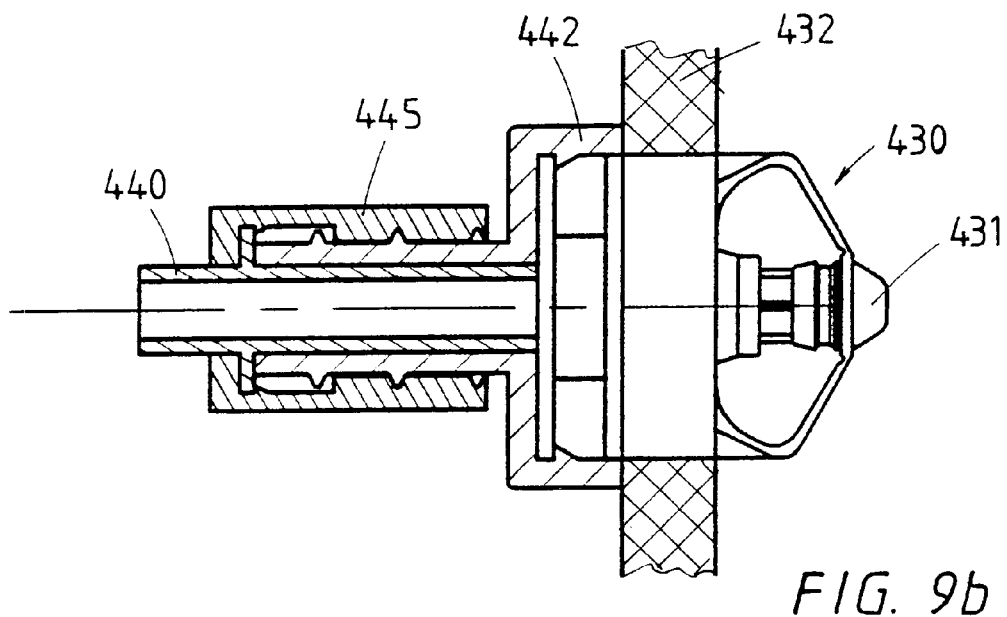

FIGS. 9a and 9b show an embodiment of the connector assembly according to the invention as a closable tap. These figures show a female part 430 with a plug 431, which are essentially the same as the female part 1 and the plug 3 shown in FIG. 1. The female part 430 is mounted in a wall 432 of a container of which only a part is shown. Furthermore a male part 440 is shown, of which the part inserted in the bore of the female part 430 is essentially the same as the corresponding part of the male part 350 in FIG. 7b. The head of the male part 440 is therefore permanently connected with the plug 431. The part inserted in the bore connects to a tubular part 441 with an axial passage, which can slide in a corresponding bore of the outer guide 442. The outer guide 442 is attached, in this case with snap fingers 443, to the female part 430. The outer guide 442 is provided with projections 444 forming an exterior screw thread. Over the end of the outer guide 442 which faces away from the female part 430 lies a bush 445 provided with interior screwthread, which meshes with the exterior screw thread of the outer guide 442. The bush 445 is designed to be gripped by the users hand and to be turned; for this purpose two handle projections 446 are moulded on. Moulded onto the tubular part 441 of the male part 440 is a driver 447, which meshes with the bush 445. By turning the bush 445 the male part 440 can be moved between a closed position, in which the plug 431 closes off the bore in the female part 430 (FIG. 9a) and an opened position, in which the male part 440 is inserted further into the bore and the plug 431 has been pushed from the bore, so that a fluid connection is provided.

Figure 10A:
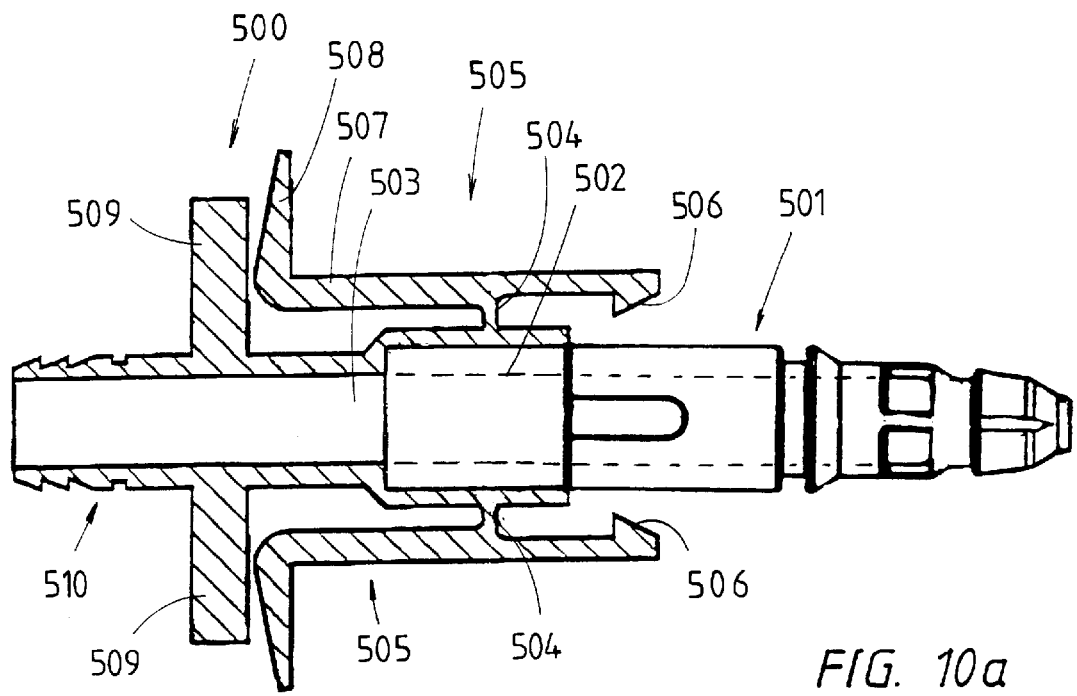
Figure 10B:
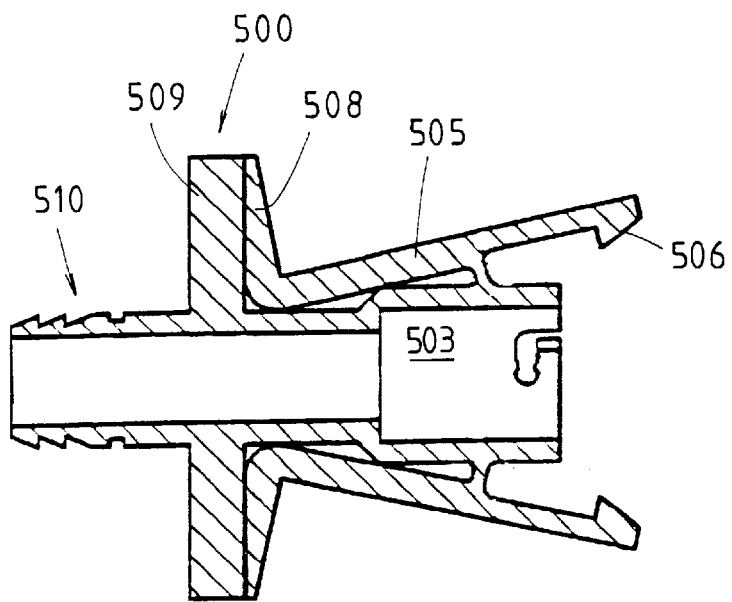

FIGS. 10a and 10b show a lock part 500 with which a variant of the male part 2 of FIG. 1, indicated by reference number 501, can be fixed to the female part 1. The malepart 501 in fact comprises the part of the male part 2 which is indicated in FIG. 1 by reference number 10 and an adjoining part 502, which fits into the bore 503 of the lock part 500. The lock part 500 and the male part 501 are provided with coupling devices, not shown here, for establishing a detachable connection between the two parts. For instance, a bayonet coupling or a snap connection may be provided. The lock part 500 is provided with one or more, preferably two diametrically opposed, tilting grippers 505. Each of the tilting grippers 505 is mounted to the lock part 500 in such a way that it can tilt around a tilting axis 504 which is placed transversal to the longitudinal axis of the bore 503. At the end where the male part 501 is inserted into the bore 503, at some distance from the corresponding tilting axis 504, each tilting gripper 505 is provided with a gripping notch 506 or similar device, with which the tilting gripper 505 can hook behind a flanged edge moulded to the female part 1, or in a corresponding recess. Furthermore each tilting gripper 505 has a part that extends from the tilting axis 504 in the direction away from the gripping notch 506. These parts are made L-shaped, with a part 507, lying along the bore 503, and a part 508 extending outward perpendicular to the bore 503. The tilting axes 504 are made of plastic and keep the tilting grippers 505 in a position in which the gripping notches 506 are close to each other.

By inserting the male part 501 shown in FIG. 10a into the bore of the female part 1, the bevelled gripping notches 506 move away from each other and lock behind an edge of the female part. By pushing the L-shaped parts 507 towards each other, the tilting grippers 505 will tilt and the gripping notches 506 will move apart, so the male part 501 can be removed from the female part 1.

A ring 509 behind the transversal legs 508 is positioned in such a way that these transversal 508 legs make contact with this ring 509 when the tilting grippers 505 are compressed, see FIG. 10b. When the male part 501 is withdrawn the ring 509 gives additional support to the transversal legs 508. At the end opposed to the male part 501 the lock part 500 has a connection part 510 for a hose or other part.

In a variant of the male part of the connector assembly according to the invention, not shown here, the male part consists of multiple connectable parts, with the part that is to be inserted into the bore of the female part being a separate part. This part can then be joined to a connecting part adjusted to the envisaged application, preferably disconnectable, for instance with a bayonet coupling or a snap connection. This makes it possible to use the connector assembly for diverse applications without changing the relatively expensive part that is to be inserted into the female part. For instance, the connecting part can be straight or bent at right angles, or designed as the lock element 500 in FIGS. 10a and 10b.

What is claimed is:

1. A connector assembly for a fluid connection, comprising a female part, a male part to be connected thereto, and a plug, the female part having a body containing an axial bore which extends from an insert opening for the male part through the body and having a seat, extending around the bore, for the plug, which serves to close off the bore; wherein the bore of the female part between the insert opening and the seat forms a shoulder, facing towards the insert opening, and the plug is provided with at least one elastic hooking part with corresponding hooking surface, the hooking part resting in a first position with its hooking surface against the shoulder; and wherein the male part has a head and a recess located behind the head for receiving the hooking part of the plug when the male part is inserted into the bore, so that the plug connects with the male part; and wherein radially next to the hooking part in its first position there is a space between the hooking part and the female part; and wherein the hooking part of the plug has been designed such that—when the male part is inserted into the bore the head of the male part pushes the hooking part from its first position to a second position which is located radially further outward compared with the first position, and such that the hooking part, after passing the head of the male part, springs elastically inward to a third position and falls into the recess of the male part while the contact between the hooking surface and the shoulder is maintained.

2. A connector assembly according to claim 1, in which the recess in the male part is such that a radial space is present between the hooking part, located in its third position, and the male part, in such a way that when the male part is inserted further into the bore, which causes the hooking part to pass the shoulder in the bore, the hooking part moves under the influence of a force exerted by the shoulder of the bore on the hooking part to a fourth position which is located further inward in the recess compared with the third position.

3. A connector assembly according to claim 1, in which the recess in the male part is such that a radial space is present between the hooking part, located in its third position, and the male part, in such a way that when the male part is inserted further into the bore, which causes the hooking part to pass the shoulder in the bore, the hooking part moves under the influence of a force exerted by the shoulder of the bore on the hooking part to a fourth position which is located further inward in the recess compared with the third position, and in which the connector assembly has been designed in such a way that the plug is free of the bore when the male part has been inserted fully into the bore, with the hooking part of the plug springing back elastically from the fourth position to the third position when it comes out of the bore.

4. A connector assembly according to claim 1, in which the recess in the male part is such that a radial space is present between the hooking part, located in its third position, and the male part, in such a way that when the male part is inserted further into the bore, which causes the hooking part to pass the shoulder in the bore, the hooking part moves under the influence of a force exerted by the shoulder of the bore on the hooking part to a fourth position which is located further inward in the recess compared with the third position, and in which the connector assembly has been designed in such a way that the plug is free of the bore when the male part has been inserted fully into the bore, with the hooking part of the plug springing back elastically from the fourth position to the third position when it comes out of the bore, and in which the bore of the female part has, at the end facing away from the insert opening, a gripping surface tapered inward in the direction of the insert opening, which can be gripped by the hooking part and which forces the hooking part to its fourth position when the plug is pulled into the bore.

5. A connector assembly according to claim 1, in which at least the one hooking part is a radially expandable and compressible ring-shaped collar at the end of the plug which faces the insert opening of the female part.

6. A connector assembly according to claim 1, in which at least the one hooking part is a radially expandable and compressible ring-shaped collar at the end of the plug which faces the insert opening of the female part, and in which the plug has a cavity which is bounded by a ring wall and an end wall and is open towards the insert opening, and which serves to receive the head moulded onto the free end of the male part.

7. A connector assembly according to claim 1, in which at least the one hooking part is a radially expandable and compressible ring-shaped collar at the end of the plug which faces the insert opening of the female part, and in which the plug has a cavity which is bounded by a ring wall and an end wall and is open towards the insert opening, and which serves to receive the head moulded onto the free end of the male part in which the collar has an inwardly tapered interior surface, which connects with an outward sloping shoulder surface, which in its turn connects with the interior surface of the ring wall, which bounds the cavity in the plug, and in which the head of the male part has a gripping surface for the interior surface of the collar, tapered inward in the direction of the free end of the head, with the diameter of the head between the gripping surface and its free end being equal to or smaller than the smallest diameter of the gripping surface.

8. A connector assembly according to claim 1, in which at least the one hooking part is a radially expandable and compressible ring-shaped collar at the end of the plug which faces the insert opening of the female part, and in which the plug has a cavity which is bounded by a ring wall and an end wall and is open towards the insert opening, and which serves to receive the head moulded onto the free end of the male part in which the collar has an inwardly tapered interior surface, which connects with an outward sloping shoulder surface, which in its turn connects with the interior surface of the ring wall, which bounds the cavity in the plug, and in which the head of the male part has a gripping surface for the interior surface of the collar, tapered inward in the direction of the free end of the head, with the diameter of the head between the gripping surface and its free end being equal to or smaller than the smallest diameter of the gripping surface, and in which the smallest diameter of the gripping surface of the head is smaller than the smallest diameter of the interior surface of the collar, and in which the taper angle of the interior surface of the collar is greater than that of the gripping surface of the male part.

9. A connector assembly according to claim 1, in which at least the one hooking part is a radially expandable and compressible ring-shaped collar at the end of the plug which faces the insert opening of the female part, and in which the plug has a cavity which is bounded by a ring wall and an end wall and is open towards the insert opening, and which serves to receive the head moulded onto the free end of the male part in which the collar has an inwardly tapered interior surface, which connects with an outward sloping shoulder surface, which in its turn connects with the interior surface of the ring wall, which bounds the cavity in the plug, and in which the head of the male part has a gripping surface for the interior surface of the collar, tapered inward in the direction of the free end of the head, with the diameter of the head between the gripping surface and its free end being equal to or smaller than the smallest diameter of the gripping surface, and in which the transition from the interior surface and the shoulder surface of the plug, viewed in the insert direction, lies axially in front of the shoulder of the bore of the female part when the plug is in its seat.

10. A connector assembly according to claim 1, in which at least the one hooking part is a radially expandable and compressible ring-shaped collar at the end of the plug which faces the insert opening of the female part, and in which the plug has a cavity which is bounded by a ring wall and an end wall and is open towards the insert opening, and which serves to receive the head moulded onto the free end of the male part, and in which the collar has an outwardly tapered exterior surface, which connects to an inwardly tapered ring-shaped hooking surface, which in its turn connects to the exterior surface of the ring wall, which bounds the cavity in the plug.

11. A connector assembly according to claim 1, in which the shoulder in the bore, viewed in the insert direction of the male part, is tapered inward and the hooking surface is formed complementary in the first position of the hooking part.

12. A connector assembly according to claim 1, in which at least the one hooking part is a radially expandable and compressible ring-shaped collar at the end of the plug which faces the insert opening of the female part, and in which the plug has a cavity which is bounded by a ring wall and an end wall and is open towards the insert opening, and which serves to receive the head moulded onto the free end of the male part in which the collar has an inwardly tapered interior surface, which connects with an outward sloping shoulder surface, which in its turn connects with the interior surface of the ring wall, which bounds the cavity in the plug, and in which the head of the male part has a gripping surface for the interior surface of the collar, tapered inward in the direction of the free end of the head, with the diameter of the head between the gripping surface and its free end being equal to or smaller than the smallest diameter of the gripping surface, and in which the male part has a shoulder surface at the rear end of the head which cooperates with the outward sloping shoulder surface in the plug.

13. A connector assembly according to claim 1, in which the recess in the male part is such that a radial space is present between the hooking part, located in its third position, and the male part, in such a way that when the male part is inserted further into the bore, which causes the hooking part to pass the shoulder in the bore, the hooking part moves under the influence of a force exerted by the shoulder of the bore on the hooking part to a fourth position which is located further inward in the recess compared with the third position, and in which the connector assembly has been designed in such a way that the plug is free of the bore when the male part has been inserted fully into the bore, with the hooking part of the plug springing back elastically from the fourth position to the third position when it comes out of the bore, and in which the bore of the female part has, at the end facing away from the insert opening, a gripping surface tapered inward in the direction of the insert opening, which can be gripped by the hooking part and which forces the hooking part to its fourth position when the plug is pulled into the bore, and in which the bore, viewed in the insert direction, has a sealing surface at the end facing away from the insert opening which connects to the gripping surface and is essentially cylindrical, and in which the plug has one or more sealing rims located around its perimeter and protruding outward.

14. A connector assembly according to claim 1, in which the head of the male part has one or more grooves, extending from its free end and ending behind the head.

15. A connector assembly according to claim 1, in which at least the one hooking part is a radially expandable and compressible ring-shaped collar at the end of the plug which faces the insert opening of the female part, and in which the plug has a cavity which is bounded by a ring wall and an end wall and is open towards the insert opening, and which serves to receive the head moulded onto the free end of the male part, and in which the head has at its tip an essentially cylindrical projection and in which the end wall of the plug forms a complementary cylindrical recess for receiving the cylindrical projection.

16. A connector assembly according to claim 1, in which at least the one hooking part is a radially expandable and compressible ring-shaped collar at the end of the plug which faces the insert opening of the female part, and in which the plug has a cavity which is bounded by a ring wall and an end wall and is open towards the insert opening, and which serves to receive the head moulded onto the free end of the male part, and in which the head of the male part is designed in such a way that the head is connected permanently to the plug.

17. A connector assembly according to claim 1, in which the plug is linked to the female part via one or more bodies located outside the bore.

18. A connector assembly according to claim 1, in which fixation devices are provided, which hold the male part with respect to the female part in a position in which the male part is located in the bore of the female part and is connected to the plug, which is in its seat, and in which the fixation devices can be removed or disabled so that the male part can be inserted further into the bore.

19. A connector assembly according to claim 1, in which fixation devices are provided, which hold the male part with respect to the female part in a position in which the male part is located in the bore of the female part and is connected to the plug, which is in its seat, and in which the fixation devices can be removed or disabled so that the male part can be inserted further into the bore, and in which the fixation devices comprise a removable ring between the male part and the female part.

20. A connector assembly for a fluid connection, comprising a female part, a male part to be connected to the female part, and a plug, with the female part having a body containing an axial bore which extends from an insert opening for the male part through the body and having a seat, extending around the bore, for the plug, which serves to close off the bore, and with the male part having an internal axial passage for passage of the liquid and a closing part located in the axial passage, whereby the plug is removed from its seat when the male part is inserted into the bore, with the feature that the closing part has a flexible ring wall, which rests under prestress against the wall of the axial passage and can spring radially inward so as to provide a passage for the liquid, wherein the closing part includes a cross wall extending in a direction transversal to the flexible ring wall, and wherein fastening devices are provided which connect the cross wall with the wall of the axial passage of the male part.

21. A connector assembly according to claim 20, in which the axial passage, in the direction of the end facing towards the plug, is made blind by means of an end wall and in which one or more cross passages are provided, each extending from the outer surface of the male part to an outlet in the axial passage.

22. A connector assembly according to claim 20, in which the axial passage, in the direction of the end facing towards the plug, is made blind by means of an end wall and in which one or more cross passages are provided, each extending from the outer surface of the male part to an outlet in the axial passage, and in which the flexible ring wall extends over the outlet of each cross passage in the axial passage.

23. A connector assembly according to claim 20, in which the axial passage of the male part includes an end wall such that the fastening devices connect the cross wall of the closing part with the end wall of the axial passage of the male part.

24. A connector assembly according to claim 20, in which the fastening devices comprise a shank moulded to an end wall of the axial passage with a radial projection located at some distance from the end wall and an opening in the cross wall of the closing part through which the shank protrudes, so that its projection hooks behind the cross wall of the closing part.

25. A connector assembly according to claim 20, in which the cross wall rests against an end wall of the axial passage of the male part.

26. A connector assembly according to claim 20, in which the closing part is made in one piece from a rubber, silicone or an elastomer.

* * * * *